(12) United States Patent
Kaku

(10) Patent No.: US 6,542,728 B1
(45) Date of Patent: Apr. 1, 2003

(54) CHARGING METHOD AND SYSTEM FOR RADIO COMMUNICATION

(75) Inventor: Tomoya Kaku, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/182,569

(22) Filed: Oct. 29, 1998

(30) Foreign Application Priority Data

Oct. 31, 1997 (JP) .............................................. 9-300836

(51) Int. Cl.[7] .............................................. H04M 11/00
(52) U.S. Cl. ........................ 455/406; 455/405; 455/407; 455/522
(58) Field of Search ................................ 455/405, 406, 455/407, 408, 69, 522; 379/112, 114, 124

(56) References Cited

U.S. PATENT DOCUMENTS

| | | | |
|---|---|---|---|
| 5,109,401 A | * 4/1992 | Hattori et al. ............... | 455/407 |
| 5,327,482 A | 7/1994 | Yamamoto | |
| 5,663,957 A | * 9/1997 | Dent ........................... | 370/347 |
| 5,666,649 A | * 9/1997 | Dent ........................... | 455/445 |
| 5,946,614 A | * 8/1999 | Robbins et al. ............. | 455/407 |
| 5,974,093 A | 10/1999 | Lee ............................. | 375/297 |
| 5,974,308 A | * 10/1999 | Vedel .......................... | 455/407 |

FOREIGN PATENT DOCUMENTS

| | | |
|---|---|---|
| CA | 2248105 | 10/1997 |
| JP | 57-210739 | 12/1982 |
| JP | 7193533 | 7/1995 |
| JP | 7283888 | 10/1995 |
| JP | 7297954 | 11/1995 |
| JP | 8-237394 | 9/1996 |
| KR | 96-27657 | 7/1996 |
| KR | 97-55858 | 7/1997 |
| WO | WO 96/41494 | 12/1996 |
| WO | 9708847 | 3/1997 |
| WO | WO 97/16034 | 5/1997 |

OTHER PUBLICATIONS

Korean Office Action issued Sep. 5, 2000 in a related application with Japanese and English translations of relevant portions.

Japanese Office Action issued Jan. 11, 2000 in a related application and English translation of relevant portions.

* cited by examiner

Primary Examiner—Lee Nguyen
(74) Attorney, Agent, or Firm—Dickstein, Shapiro, Morin & Oshinsky, LLP.

(57) ABSTRACT

In a radio communications system where a base station communicates with each terminal while controlling transmission power of a channel used for communication between the base station and the terminal, a magnitude of the transmission power is monitored and a communication charge rate is determined based on the magnitude of the transmission power. A communication charge for the communication is calculated using as parameters the communication charge rate and a time period during which the communication charge rate is kept.

22 Claims, 6 Drawing Sheets

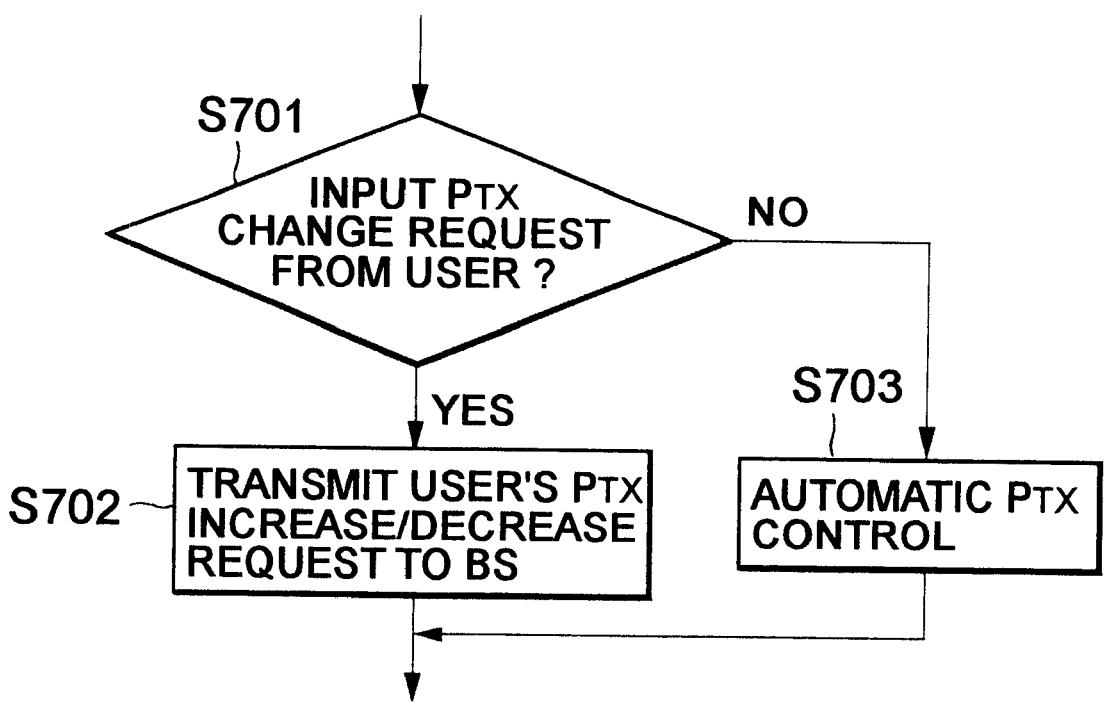

CHARGING METHOD AND SYSTEM FOR RADIO COMMUNICATION

BACKGROUND OF THE INVENTION

1. Field of the Invention

The present invention relates to a charging system for radio communication such as radio telephone and radio data transmission and, more particularly, to a charging method and system in a radio communications system using a DS-CDMA (Direct Sequence—Code Division Multiple Access) scheme.

2. Description of Related Art

In the DS-CDMA system, a plurality of channels are assigned to a single frequency band, and each user's PN (pseudo-random noise) sequence or orthogonal code is generated to allow receivers to distinguish among different users signals. That is, the receiver performs reverse-spreading or despreading of the received signal by multiplying it by a replica of the PN sequence used at the transmitter. According to Interim Standard 95 (IS 95) released by TIA (Telecommunications Industry Association) in North America for Code Division Multiple Access (CDMA), the 64-bit Walsh orthogonal code sequence is used which consists of 64 kinds of code sequences with zero mutual correlation between them and can accommodate a maximum of 64 channels in one frequency band.

Since the receiver uses such a spreading code unique to the desired user signal, the signals coded with other users' codes simply appear as noise, resulting in deteriorated quality of communications. Generally, it is necessary to limit the number of channels so as not to generate interference between the channels in the radio communications system.

In the above-described North American Standard TTA.IS-95, the electric field strength of a radio signal received from each user is measured at a base station and the received-signal strengths are controlled to become all the same at the receiving antenna of the base station. In other words, transmission power of terminal stations is precisely controlled to make the transmission power of a terminal station located far from the base station larger because of a relatively large loss in a propagation path to the terminal station. Contrarily, transmission power of a terminal station near the base station becomes smaller because of a relatively small loss of a propagation path to these terminal stations. In this way, the transmission power of each terminal must be precisely controlled in any DS-CDMA system serving mobile users.

Further, a terminal station also measures the electric field strength of a radio signal received from the base station, and reports a result of the measurement to the base station when necessary. In the case where the electric field strength of the received signal from the base station is not sufficiently large at the terminal station, this terminal station makes a request to the base station to increase the transmission power of the channel that is being used for communication. Then, the base station increases transmission power to the terminal station that has transmitted the request for power increase.

On the other hand, examples of conventional charging systems for portable telephones are disclosed in Japanese Patent Application Laid-open Publication No. 7-297954, No. 7-193533 and No. 7-283888.

According to Japanese Patent Application Laid-open Publication No. 7-297954, there are provided charging method and system for a case where a public portable telephone terminal station utilizes an access service to a public mobile telephone network through a private branch exchange (PBX) of a private area different from a public area.

Specifically, a charge for facility utilization of a private area is stored in a charge data base. Further a charge for service obtained by a public portable section (hereinafter to be referred to as a public PS) as well as communication charge via a public mobile telephone network are also stored in the charge data base. These stored communication charges and facility utilization charges are output to charge fees to the public PS. Alternately, information on the facility utilization charges received through a PBX and communication charges via the public mobile telephone network are stored in the charge data base of the public telephone network. The stored communication charges and facility utilization charges are output to charge fees to the public PS.

Based on this system, when the user of the public PS has obtained services via the PBX of the private area, it becomes possible for a PBX owner to charge the facility utilization fees to the user other than the utilization charges of the public mobile telephone network and for a public telephone network operator to charge the fees in place of the PBX owner.

According to Japanese Patent Application Laid-open Publication No. 7-193533, there are provided method and means for recovering (charging) a purchase cost of a booster by including it in a utilization charge of a portable telephone. Specifically, the booster has a controller having a charge information storing function therein. The controller uses the charge information storing function to store a registered telephone number of a portable telephone and communication time of the corresponding portable telephone to a memory. By reading the registered telephone number and the communication time thereof from the booster, the user who has purchased the booster and its telephone number can be identified. Therefore, the booster utilization fee for the portable telephone can be charged.

According to Japanese Patent Application Laid-open Publication No. 7-283888, there is provided a charging system for CDMA communications system. Specifically, speech information is encoded at a transmission rate depending on the amount of the voice information, and the encoded signal is transmitted at a transmission power depending on the transmission rate. A mobile terminal is provided with a charge setting means through which a user of the mobile terminal can set the maximum transmission rate. A communication charge is set depending on traffic of communication channels and the maximum transmission rate of voice information. Therefore, when increasing in traffic volume, a user will make effort to lower a maximum transmission rate of voice information as far as possible in order to minimize a communication charge. As a result, it becomes possible to lower interference between the channels during heavy-traffic time periods. It is also made possible to increase the number of communication channels depending on a reduction in interference.

As described before, in the CDMA communications system, communication channels are discriminated based on each user's PN sequence or orthogonal code which allows a plurality of receivers to distinguish among different users signals in the same frequency band. Therefore, for each receiver, the signals coded with other users' codes simply appear as noise.

To minimize such noise, in an up link from a mobile terminal to a base station, the base station controls the transmission power of each mobile terminal so that the same power is received from every mobile terminal and the power level is constant over time. By this arrangement, noise (interference) between up-link channels is minimized. In a down link from the base station to each terminal station, the received signal strength at the receiving antenna of the mobile terminal becomes the same if the transmission power for each down-link channel is set at the same value. In other words, when the transmission power of each down-link channel is set at the same level, noise (interference) between down-link channels is minimized.

When a mobile terminal receives insufficient electric field strength of a radio signal from the base station, this mobile terminal can make a request to the base station to increase the transmission power of the in-use channel. At the request of the mobile terminal, the base station increases the magnitude of the transmission power to that mobile terminal. Such a transmission power increase request may be generated when the sensitivity of signal reception is not sufficient. The receiving sensitivity may be reduced, for example, when a mobile terminal is located at a position relatively far from the base station or when the hardware of the mobile terminal develops a problem.

The increased transmission power of one channel for a certain mobile terminal causes other channels to increase in noise or interference, resulting in deteriorated quality of the other channels.

According to the above conventional charging methods, charge rates are basically determined depending on the time period during which one communication channel is occupied. According to Japanese Patent Application Laid-open Publication No. 7-283888, charge rates are determined based on both the transmission rate of voice information specified by the user and the channel-occupying time period. In other words, the charge rate is the same over all the channels regardless of an increase or decrease in the transmission power of the base station.

SUMMARY OF THE INVENTION

The inventor has found that such a situation implies an unfair aspect, in that the same charge rate is applied to a mobile terminal which generates noise for to other channels, and to other mobile terminals that are affected by the noise.

It is therefore an object of the present invention to provide a charging method and system that can eliminate the above-described unfair aspect.

It is another object of the present invention to provide a charging method and system that can inform a user of a change of charge rate.

According to a first aspect of the present invention, in a radio communications system where a basic station communicates with each terminal while controlling transmission power of a channel used for communication between the base station and the terminal, a magnitude of the transmission power is monitored and a communication charge rate is determined based on the magnitude of the transmission power. A communication charge for the communication is preferably calculated using as parameters the communication charge rate and a time period during which the communication charge rate is kept.

According to a second aspect of the present invention, at the base station, a magnitude of the transmission power is monitored and a communication charge rate is determined based on the magnitude of the transmission power. The communication charge rate is transmitted to the terminal. At the terminal, the communication charge rate is displayed on screen and/or a change of the communication charge rate is alerted by one of light and vibration.

According to a third aspect of the present invention, when the base station receives a request for changing the transmission power from the terminal, a magnitude of the transmission power is changed depending on the request and a communication charge rate is determined based on the magnitude of the transmission power. The request may be generated at the terminal in response to a user's instruction.

BRIEF DESCRIPTION OF THE DRAWINGS

FIG. 7 is a flow chart showing an operation for requesting a change of transmission power in the terminal station according to the present invention.

DETAILED DESCRIPTION OF PREFERRED EMBODIMENTS

Figure 1:
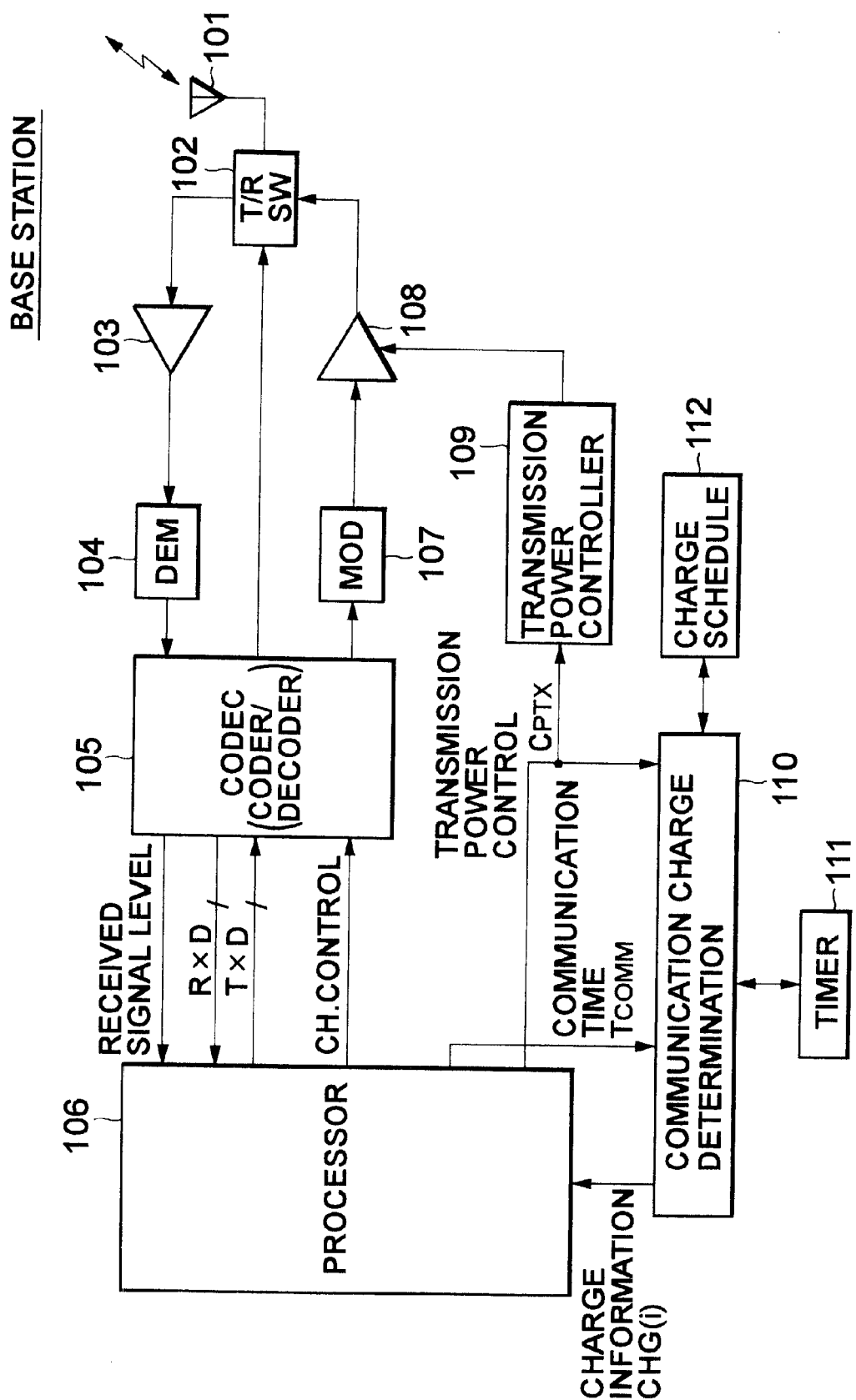
FIG. 1 is a block diagram showing a circuit configuration of a base station including a charging system according to an embodiment of the present invention.

Referring to FIG. 1, there is shown a base station of a DS-CDMA radio communications system including a charging system according to an embodiment of the present invention. For simplicity, there will be described a case where the base station is communicated with a terminal station which is charged for its communication.

The base station receives radio signals through an antenna 101 from terminal stations and the received radio signals are transferred through a T/R switch 102 to an amplifier 103. The amplifier 103 amplifies and outputs them to a demodulator 104, which demodulates the received radio signals into baseband signals and outputs them to a coder/decoder (codec) 105. The codec 105 decodes the baseband signals using the specified code sequence as described before to output received data RxD (here, speech data) to a processor 106.

In transmission, data TxD to be transmitted is coded by the codec 105 using the specified code sequence and the coded signal is output to a modulator 107 which modulates a carrier according to the coded signal to produce a transmission radio signal. A variable-gain power amplifier 108 amplifies the transmission radio signal by a gain factor controlled by a transmission power controller 109 depending on a transmission power control signal $C_{PTX}$ input from the processor 106. The power-adjusted transmission radio signal is transmitted to the mobile terminal through the T/R switch 102 and the antenna 101.

The base station is further provided with a communication charge determination section 110, a timer 111 and a charge schedule memory 112. The communication charge determination section 110 and the timer 111 may be implemented with software running on the processor 106.

As will be described in detail, the communication charge determination section 110 inputs the transmission power control signal $C_{PTX}$ and communication time $T_{COMM}$ from the processor 106 and starts the timer 111 in response to the communication time $T_{COMM}$. The communication charge determination section 110 detects the magnitude of the transmission power by monitoring the transmission power control signal $C_{PTX}$ and determines a charge rate depending on the magnitude of the transmission power by referring to the charge schedule memory 112. The charge rate is output as charge information CHG(i) to the processor 106 and then is transmitted to the mobile terminal. Further, the communication charge determination section 110 calculates the charge for the communication based on the determined charge rate and the count of the timer 111, in other words, using as parameters the magnitude of a determined transmission power and the time $T_{COMM}$.

Figure 2:
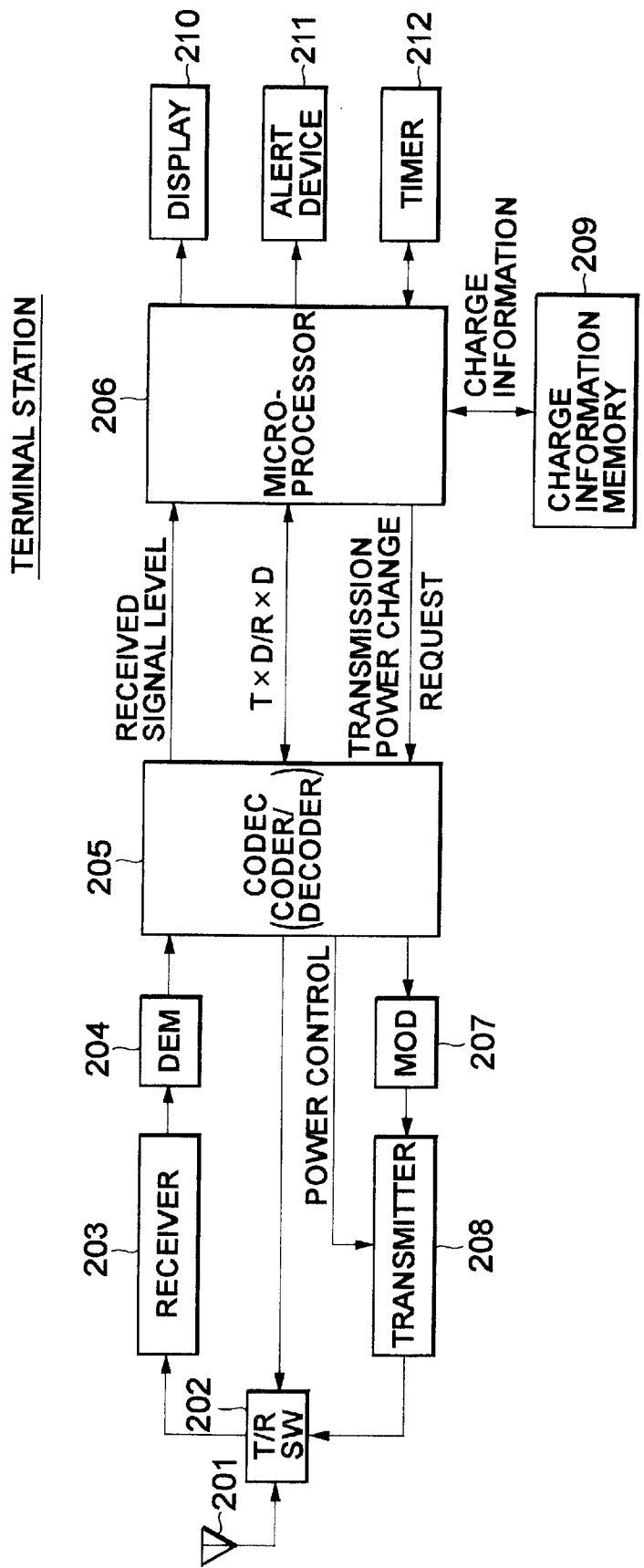
FIG. 2 is a block diagram showing a circuit configuration of a terminal station in a charging system according to an embodiment of the present invention.

Referring to FIG. 2, a terminal station receives radio signals through an antenna 201 and the received radio signals are transferred to a receiver 203 through a T/R switch 202 and then are demodulated into baseband signals by demodulator 204. The baseband signals are decoded into received data RxD (here, speech data) by a codec 205 using the specified code sequence and then the received data RxD is output to a microprocessor 206.

In transmission, data TxD to be transmitted is coded by the codec 205 using the specified code sequence and the coded signal is output to a modulator 207 which modulates a carrier according to the coded signal to produce a transmission radio signal. A transmitter 208 amplifies the transmission radio signal depending on a power control signal and transmits it to the base station through the T/R switch 202 and the antenna 201.

The microprocessor 206 controls the operations of the terminal station by running a control program stored in a read-only memory (not shown). When receiving charge information CHG from the base station, the charge information CHG is stored in a charge information memory 209. The charge information is displayed on a display device 210 such as liquid-crystal display (LCD) or a light-emitting diode and further, if necessary, an alert device 211 such as a light-emitting diode or a vibrator may be started as will be described later. The microprocessor 206 may use a timer 212 to calculate a total charge for the communication.

When the received signal level is decreased, the microprocessor 206 generates a transmission power-increasing request and transmits it to the base station. Contrarily, when the received signal level is sufficiently high, the microprocessor 206 can generate a transmission power-decreasing request and transmit it to the base station according to a user's instruction.

COMMUNICATION CHARGE DETERMINATION

As examples of the operation of the present invention, two methods for calculating a communication charge will be explained in detail with reference to FIGS. 3 and 4.

Figure 3:
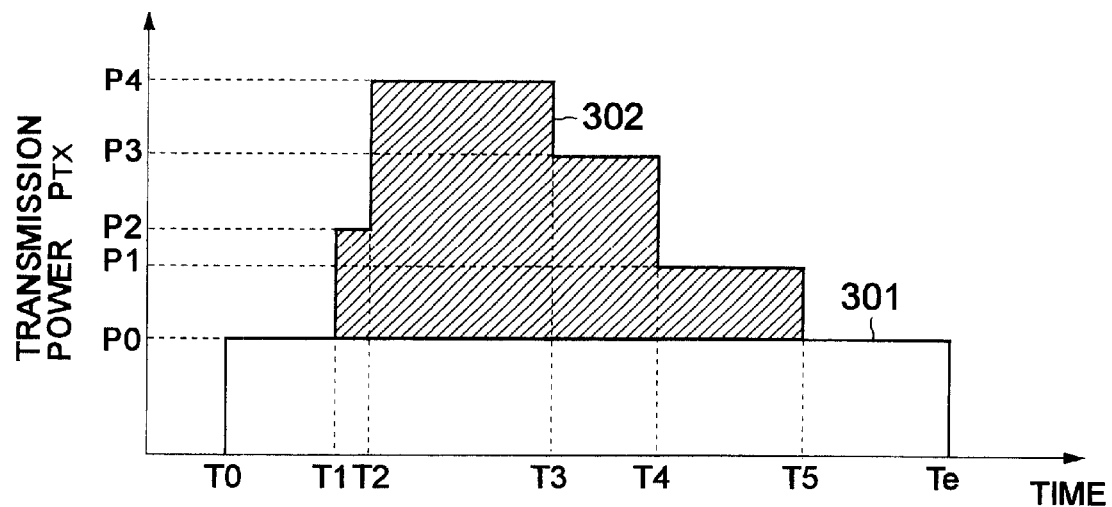
FIG. 3 is a graph showing an example of time-varying charge rate in a first embodiment of a communication-charging method according to the present invention.
Figure 4:
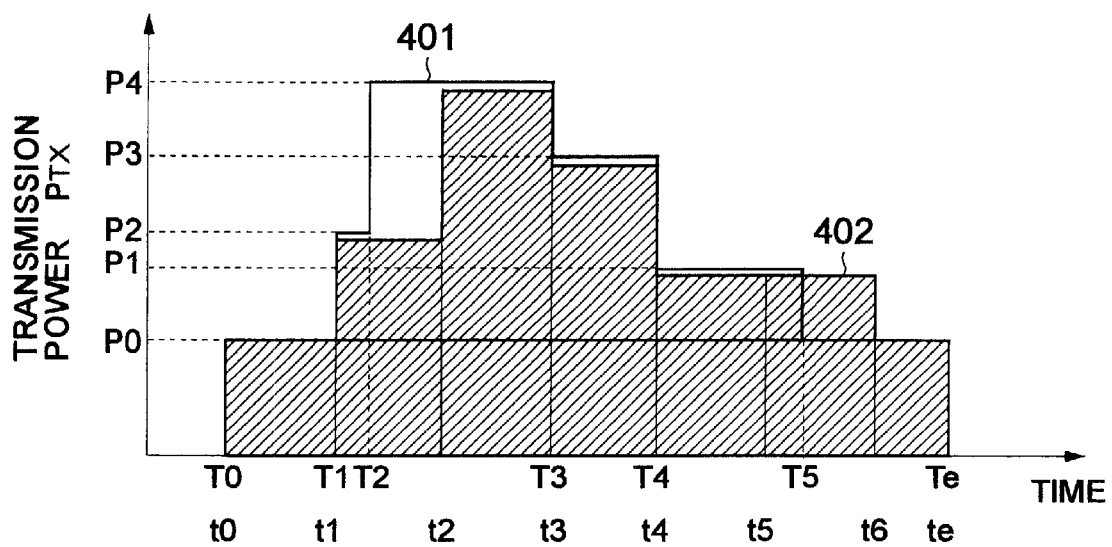
FIG. 4 is a graph showing an example of time-varying charge rate in a second embodiment of a communication-charging method according to the present invention.

Referring to FIGS. 3 and 4, a horizontal axis represents time and a vertical axis represents a transmission power $P_{TX}$ set by the transmission power controller 109. Thus, FIGS. 3 and 4 shows an example of the relationship between elapsed time and the transmission power.

The communication charge rate reflects the magnitude of transmission power $P_{TX}$ and FIGS. 3 and 4 shows different charge schedules as described hereinafter.

Referring to FIG. 3, the communication charge is calculated based on the magnitude of a transmission power $P_{TX}$ that is determined when the transmission power controller 109 has changed the gain of the transmission power amplifier 108 at the request of the terminal station. In this case, an initial transmission power $P_{TX}$ is set to P0 at the time T0 when the communication starts and the transmission power P0 is kept during a time period from time T0 to time T1 and during a time period from T5 to Te as indicated by an area 301. Such a time period is obtained by the timer 111 reset by each change of the transmission power. However, at time T1, the transmission power $P_{TX}$ is set to P2 larger than the initial power P0 until time T2. At the time T2, the transmission power $P_{TX}$ is further increased to P4. Thereafter, the transmission power $P_{TX}$ is decreased to P3 at time T3 and then to P1 at time T4 and finally to the initial power P0 at time T5. In this manner, the transmission power $P_{TX}$ is set to more than the initial power P0 during a time period from time T1 to T5 as indicated by a diagonally shaded area 302.

Therefore, during this time period from T1 to T5 as indicated by the diagonally shaded area 302, the terminal station is affecting other terminal stations as described before. Accordingly, the communication charge determination section 110 adds additional communication charge proportional to the diagonally shaded area 302 to the basic charge.

In this case, the communication charge rate corresponding to the transmission power $P_{TX}$ may be transmitted as charge information CHG to the terminal station each time the transmission power $P_{TX}$ is changed. Further, a total communication charge proportional to the diagonally shaded area 302 may be transmitted to the terminal station after the communication is terminated.

Referring to FIG. 4, the communication charge determination section 110 detects the magnitude of a transmission power $P_{TX}$ at regular intervals, t0, t1, t2, . . . , t6, during the time period from T0 to T2 and calculates the communication charge based on the respective detected magnitudes of transmission power $P_{TX}$.

Assuming that the transmission power $P_{TX}$ is changed during the time period from time T0 to Te as shown by line 401 that indicates the same change as in FIG. 3. In this case, the communication charge determination section 110 detects the magnitude of a transmission power $P_{TX}$ at sampling instants t0, t1, t2, . . . , t6. Therefore, the detected magnitude of transmission power $P_{TX}$ is set to P0 during a time period from t0 to t1 and then to P2 during a time period from t1 to t2. Similarly, during a time period from t2 to t3, the detected magnitude of transmission power $P_{TX}$ is set to P4. In this manner, the transmission power $P_{TX}$ is detected and used to calculate the communication charge during a time period from time T0 to Te as indicated by a diagonally shaded area 402.

In this schedule as shown in FIG. 4, since the terminal station is affecting other terminal stations during this time period from T1 to T5, the communication charge reflects the change of the transmission power $P_{TX}$ and is determined as shown by the diagonally shaded area 402. In this case, the communication charge rate corresponding to the transmission power $P_{TX}$ may be transmitted as charge information CHG to the terminal station at sampling intervals.

CHANGE OF TRANSMISSION POWER AND CHARGE

Figure 5:
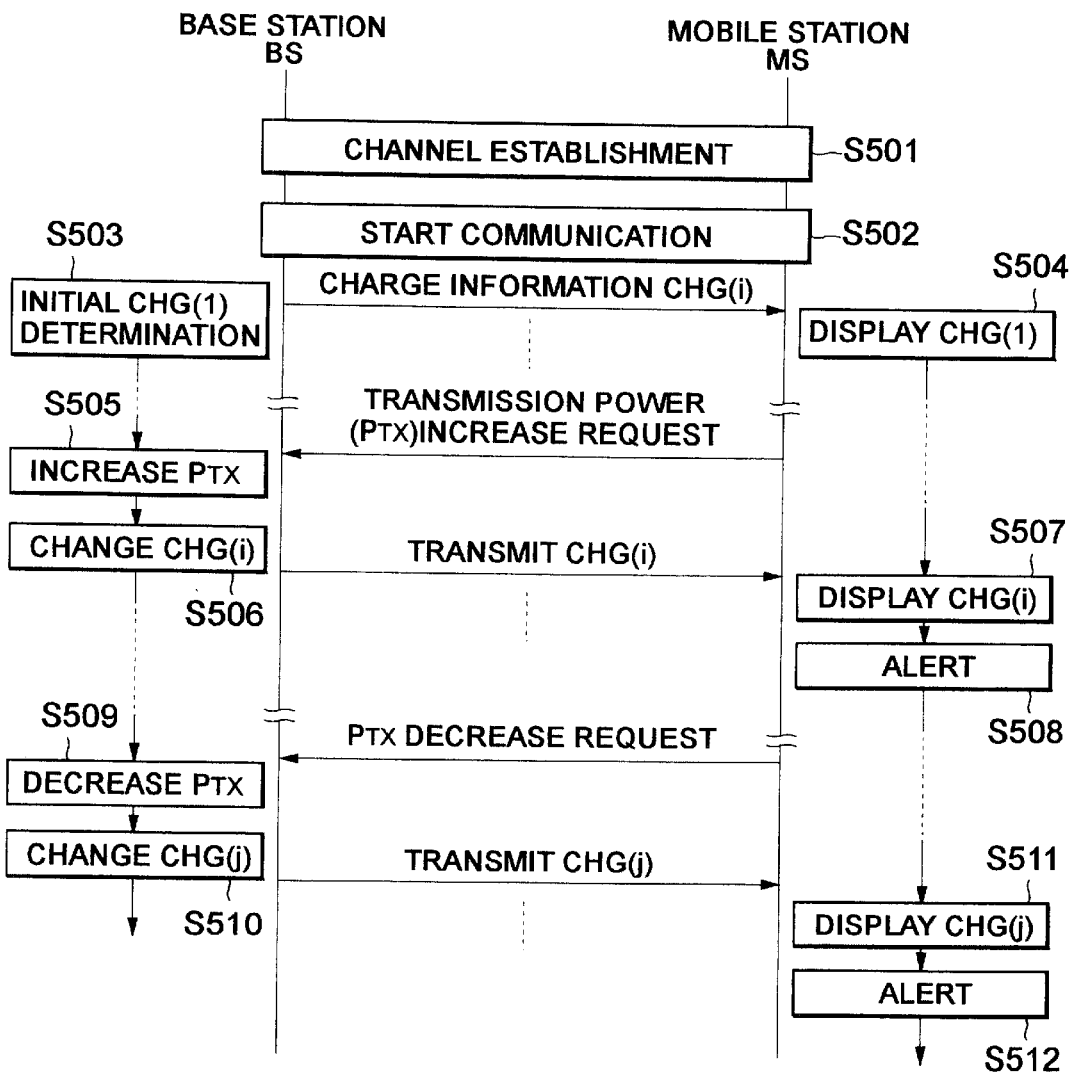
FIG. 5 is a sequence diagram showing an operation of the charging system according to the present invention.

Referring to FIG. 5, after establishing a channel between the base station and the terminal station (step S501), the base station starts communication with the terminal station at time T0 (step S502). At this time, the processor 106 outputs the transmission power control signal $C_{PTX}$ to the transmission power controller 109 so that the transmission power amplifier 108 is set to an initial transmission power P0. At the same time, the communication charge determination section 110 determines the communication charge rate corresponding to the initial transmission power P0 and outputs it as charge information CHG(1) to the processor 106 (step S503). The processor 106 controls the codec 105 to transmit the charge information CHG(1) to the terminal station.

When receiving the charge information CHG(1) from the base station, the microprocessor 206 of the terminal station stores it to the charge information memory 209 and controls the display device 210 to display it (step S504).

In the case where the terminal station requests for an increase in transmission power for some reason, the processor 106 of the base station controls the transmission power controller 109 to increase the transmission power to P2 at time T1 (step S505). The communication charge determination section 110 changes the communication charge rate from CHG(1) to CHG(i) according to the charge schedule and then outputs it to the processor 106 (step S506). The processor 106 controls the codec 105 to transmit the charge information CHG(i) to the terminal station.

When receiving the charge information CHG(i) from the base station, the microprocessor 206 of the terminal station stores it to the charge information memory 209 and controls the display device 210 to display it (step S507). At the same time, the microprocessor 206 drives the alert device 211 to inform a user of an increase of charge rate (step S508). The microprocessor 206 may compare the new charge information CHG(i) to the previous charge information CHG(1) and, if they are not identical, then the alert device 211 may be driven.

If the terminal station makes another respect for a further increase in the transmission power to the base station because the sensitivity of signal reception is still poor at the transmission power of P2, then the base station sets the transmission power to P4 at time T2 as described before. And the terminal station displays the new communication charge information on screen and informs the user of a further increase of charge rate by light or sound caused by the alert device 211.

In the case where the terminal station makes a request for a reduction in the transmission power to the base station because the sensitivity of signal reception is sufficiently good at the transmission power P4, then the base station sets the transmission power to P3 at time T3 (step S509). The communication charge determination section 110 changes the communication charge rate from CHG(i) to CHG(j) according to the charge schedule and then outputs it to the processor 106 (step S510). The processor 106 controls the codec 105 to transmit the charge information CHG(j) to the terminal station.

When receiving the charge information CHG(j) from the base station, the microprocessor 206 of the terminal station stores it to the charge information memory 209 and controls the display device 210 to display it (step S511). At the same time, the microprocessor 206 drives the alert device 211 to inform a user of a reduction of charge rate (step S512).

As described above, a charge of communication charge is reported as charge information to the terminal station at regular intervals or when the transmission power is changed. At the terminal station, this charge information is displayed and an alert is generated as necessary. Therefore, the user can know the current communication charge rate from this charge information. The use may be informed of the charge information by speech output from a speaker or by vibration.

Further, the user can quickly understand any inconvenience of the terminal station from the charge information. If the sensitivity of signal reception of the terminal station has become poor for some reason, transmission power from the base station is set larger so that the communication charge increases. Accordingly, the user can notice that the terminal station can become in a bad condition from this fact.

TERMINAL STATION

Another embodiment of the present invention will be explained below with reference to FIG. 6. In the embodiment, the terminal station is further provided with communication charge calculating function that may be implemented with software or a separate communication charge processor.

Figure 6:
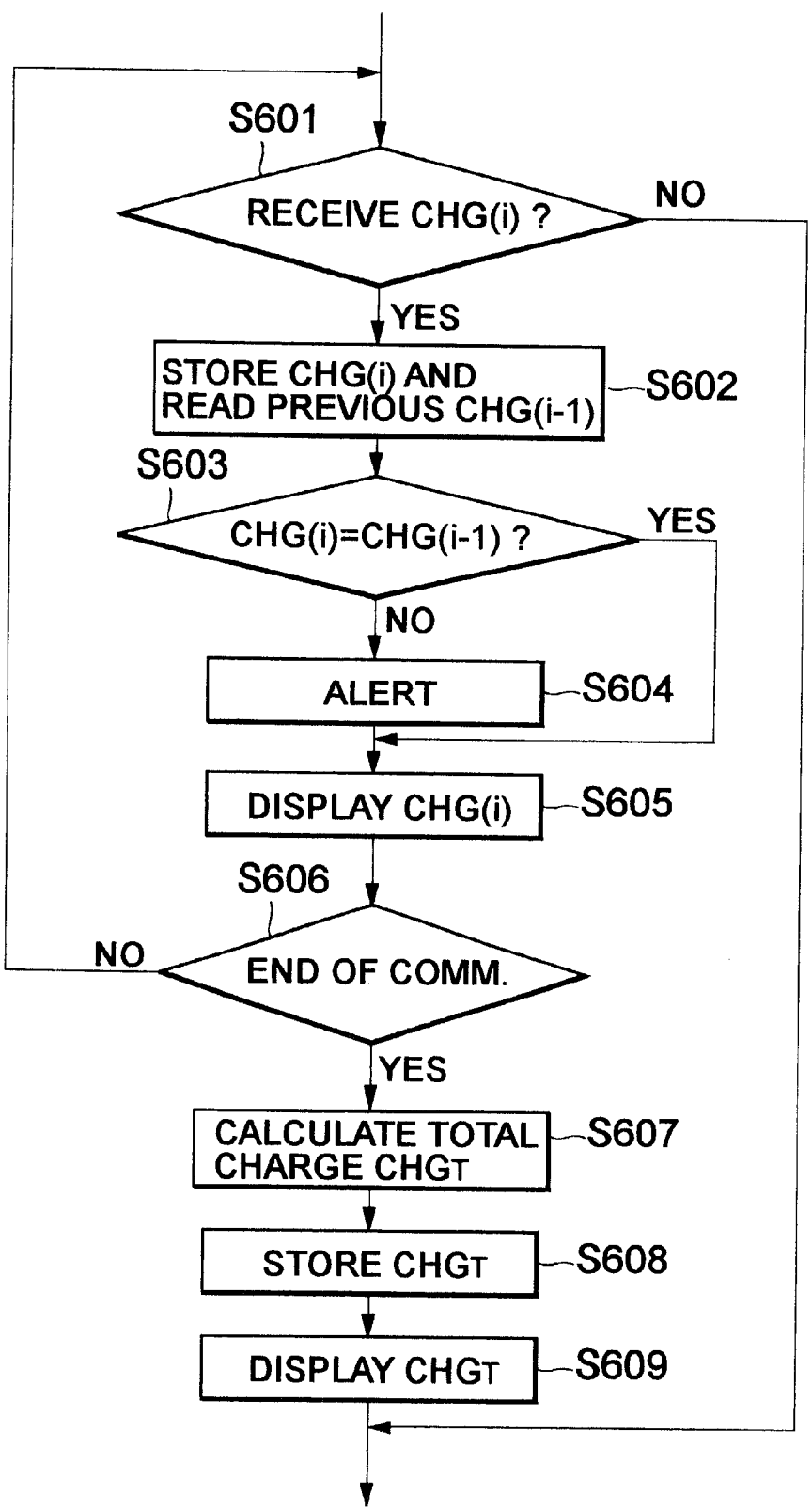
FIG. 6 is a flow chart showing a charge information receiving operation of the terminal station according to the present invention.

Referring to FIG. 6, the microprocessor 206 of the terminal station determines whether charge information CHG (1) is received from the base station (step S601). If received (YES in step S601), then the current charge information CHG(1) is stored in the charge information memory 209 and the previously received charge information CHG(1-l) from the charge information memory 209 (step S602). Thereafter, it is determined whether the current charge information CHG(1) is equal to the previous charge information CHG (i-1) (step S603), When CHG(i) is different from CHG(i-1) (NO in step S603), the microprocessor 206 drives the alert device 211 to inform the user of a change of communication charge (step S604) and controls the display device 210 to display the current charge information CHG(i) on screen (step S605). If CHG(i) is equal to CHG(i-1) (YES in step S603), the current charge information CHG(i) is only displayed on screen (step S605). The steps S601–S605 are repeatedly performed until the communication is terminated (step S606).

During the communication period, the microprocessor 206 or the communication charge processor accumulates the charge information received from the base station. When the communication has been terminated (YES in step S606), the microprocessor 206 or the communication charge processor calculates a result of this accumulation as a total communication charge $CHG_T$ (step S607) and stores it in the charge information memory 209 (step S608) and further displays it on the display device 210 (step S609). Thus, the user of the terminal station can know the total charge for the communication immediately after the completion of the communication.

The charge information CHG(i) is stored in the charge information memory 209 each time it is received. Thus, it becomes easily possible to known a communication charge for past communication. Further, it becomes possible to know a magnitude of inconvenience and to specify a time when the inconvenience occurred by reading out a sequence of the past charge information from the charge information memory 209 at an occasion when the terminal station is placed for repairs and maintenance.

Further, it is also possible to provide a communication charge comparing function in the terminal station. The communication charge comparing function compares the current total communication charge with the past total communication charge for one communication. Therefore, the user can be informed of a fact that the current communication charge is higher than in the past. Thus, it becomes possible to automatically inform the user of an occurrence of any inconvenience in the terminal station currently used.

TRANSMISSION POWER SELECTION

Referring to FIG. 7, the terminal station is further provided with user's specified transmission power change function. The microprocessor 206 determines whether a transmission power change request is input from the user through an input key pad (step S701). If the user's instruction is input (YES in step S701), the microprocessor 206 transmits the er's specified transmission power change request to the base station (step S702). Contrarily, if the user's instruction is not input (NO in step S701), the microprocessor 206 performs an automatic transmission power control as in the conventional case (step S703).

Since the user can select the communication condition, it is possible to provide communication services for securing a communication channel of better sensitivity of signal reception by deliberately setting the transmission power at a higher level. This results in a setting of an expensive communication charge as compared with a normal communication charge. However, by setting the transmission power of the base station at a higher level, better sensitivity of signal reception can be secured at the terminal station, which leads to a provision of communication services with small error rate. For example, it becomes possible to provide such services for data communications that require error rate to be restricted to a minimum.

On the contrary, it is also considered possible to provide communication services with lower communication charges by setting transmission power of the base station to a smaller value in advance for communications that have little problem even if error rate becomes slightly higher.

As described above, a first advantage of the present invention resides in that a communication charge is calculated based on the channel-occupying time period and the magnitude of transmission power of the base station. This solves the problem of the prior art techniques, that is, the unfair aspect that the communication charge of a terminal station that increases noise is the same as the communication charges of all the other terminal stations being affected by the noise.

A second advantage of the invention resides in that charge information obtained by the base station is transmitted to a terminal station and the charge information can be provided to the user of the terminal station. With this arrangement, the user can know in real time the information relating to the charges of the terminal station.

A third advantage of the invention resides in that the terminal station is provided with a communication charge processing function for calculating the communication charge from the charge information received from the base station. With this arrangement, the user of the terminal station can know a communication charge immediately after the completion of the communication.

A fourth advantage of the invention resides in that a memory for storing charge information is provided in the terminal station. With this arrangement, it becomes possible for the user of the terminal station to compare past communication charges with a current communication charge. By this comparison, the user can detect an occurrence of an abnormal condition in the terminal station. Further, it becomes possible to know a magnitude of the inconvenience by analyzing data stored in the memory at the time of carrying out repairs and maintenance of the terminal station for reason of poor condition of the terminal station or the like.

A fifth advantage of the invention resides in that the terminal station is provided with a means for carrying out a comparison between past communication charges and a current communication charge and informing the user of that the current communication charge is expensive as compared with the past communication charges. With this arrangement, it becomes possible to carry out automatically the comparison between the communication charges described in the fourth advantage without involving an operation of the user and to inform the result of the comparison to the user from the terminal station.

Lastly, it becomes possible to provide communication services that ensure a securing of a communication channel with better sensitivity of signal reception by deliberately increasing the transmission power of the base station through combined use of various effects of the present invention. This leads to a setting of relatively higher communication charges than normal charges. However, the setting of the base station transmission power at a higher level ensures a securing of higher sensitivity of signal reception at the terminal station, which makes it possible to provide communication services of smaller error rate in the end.

What is claimed is:

1. In a CDMA (code Division Multiple Access) radio communication system where a base station communicates with each terminal while controlling transmission power of a channel used for communication between the base station and the terminal depending on a transmission power change request received from the terminal, a method for charging the terminal for communication, comprising the steps of:

(a) monitoring a magnitude of the transmission power in response to the transmission power change request received from the terminal; and (b) determining a communication charge rate based solely on the magnitude of the transmission power that is controlled depending on the transmission power change request received from the terminal.

2. The method according to claim 1, further comprising the step of:

c) calculating a communication charge for the communication using as parameters the communication charge rate and a time period during which the communication charge rate is kept.

3. The method according to claim 2, wherein the step c) comprises the steps of:

detecting a time instant when the magnitude of the transmission power is changed; and calculating the communication charge for the communication based on the communication charge rate and the time instant.

4. The method according to claim 2, wherein, in the step a), the magnitude of the transmission power is monitored at regular intervals.

5. In a CDMA (code Division Multiple Access) radio communications system where a base station communicates with each terminal while controlling transmission power of a channel used for communication between the base station and the terminal depending on a transmission power change request received from the terminal, a method for charging the terminal for communication, comprising the steps of:

at the base station, (a) monitoring a magnitude of the transmission power in response to the transmission power change request received from the terminal;

(b) determining a communication charge rate based solely on the magnitude of the transmission power that is controlled depending on the transmission power change request received from the terminal;

(c) transmitting the communication charge rate to the terminal; and at the terminal, (d) causing an indication of the communication charge rate.

6. The method according to claim 5, wherein the step d) comprises the step of causing a display of the communication charge rate on screen.

7. The method according to claim 5, wherein the step d) comprises the step of causing an alert of a change of the communication charge rate by one of light and vibration.

8. The method according to claim 5, wherein the step d) comprises the steps of:
causing a display of the communication charge rate on screen; and
causing an alert of a change of the communication charge rate by one of light and vibration.

9. The method according to claim 5, wherein the step c) comprises the steps of:
detecting a time instant when the magnitude of the transmission power is changed; and
transmitting the communication charge rate to the terminal at the time instant.

10. The method according to claim 5, wherein,
in the step a), the magnitude of the transmission power is monitored at regular intervals; and
in the step c), the communication charge rate is transmitted to the terminal at the regular intervals.

11. The method according to claim 10, wherein the step d) comprises the steps of:
causing a display of the communication charge rate on screen;
comparing the communication charge rate with a previously received communication charge rate; and
causing an alert of a change of the communication charge rate by one of light and vibration when the communication charge rate is different from a previously received communication charge rate.

12. In a CDMA (code Division Multiple Access) radio communications system where a base station communicates with each terminal while controlling transmission power of a channel used for communication between the base station and the terminal depending on a transmission power change request received from the terminal, a method for charging the terminal for communication, comprising the steps of:
at the base station,
(a) monitoring a magnitude of the transmission power in response to the transmission power change request received from the terminal;
(b) determining a communication charge rate based solely on the magnitude of the transmission power that is controlled depending on the transmission power change request received from the terminal;
(c) transmitting the communication charge rate to the terminal; at the terminal,
(d) calculating a communication charge for the communication using as parameters the communication charge rate received from the base station and a time period during which the communication charge rate is kept;
(e) causing a display of the communication charge.

13. In a CDMA (code Division Multiple Access) radio communications system where a base station communicates with each terminal while controlling transmission power of a channel used for communication between the base station and the terminal, a method for charging the terminal for communication, comprising the steps of:
(a) receiving a transmission power change request for changing the transmission power from the terminal;
(b) changing a magnitude of the transmission power depending on the transmission power change request;
(c) monitoring a magnitude of the transmission power in response to the transmission power change request; and
(d) determining a communication charge rate based solely on the magnitude of the transmission power which has been changed depending on the transmission power change request.

14. The method according to claim 13, further comprising the step of:
d) calculating a communication charge for the communication using as parameters the communication charge rate and a time period during which the communication charge rate is kept.

15. The method according to claim 13, wherein at the terminal, the request is generated in response to a user's instruction.

16. A system for charging a terminal for communication in a CDMA (code Division Multiple Access) radio communications system where a base station communicates with each terminal while controlling transmission power of a channel used for communication between the base station and the terminal, the base station comprising:
a power controller for controlling the transmission power in response to the transmission power change request received from the terminal;
a monitor for monitoring a magnitude of the transmission power; and
a charge determination processor for determining a communication charge rate based solely on the magnitude of the transmission power that is controlled depending on the transmission power change request received from the terminal.

17. The system according to claim 16, wherein the charge determination processor further calculates a communication charge for the communication using as parameters the communication charge rate and a time period during which the communication charge rate is kept.

18. The system according to claim 16, wherein the base station transmits the communication charge rate to the terminal, wherein the terminal comprises:
a receiver for receiving the communication charge rate from the base station; and
an indicator for indicating the communication charge rate.

19. The system according to claim 16, wherein the indicator is a display for displaying the communication charge rate on screen.

20. The system according to claim 16, wherein the indicator is an alert device for alerting a change of the communication charge rate by one of light and vibration.

21. A base station for use in a system for charging a terminal for communication in a CDMA (code Division Multiple Access) radio communications system where a base station communicates with each terminal while controlling transmission power of a channel used for communication between the base station and the terminal, the base station comprising:
a power controller for controlling the transmission power in response to a transmission power change request received from the terminal;
a monitor for monitoring a magnitude of the transmission power that is controlled depending on the transmission power change request received from the terminal; and
a charge determination processor for determining a communication charge rate based solely on the magnitude of the transmission power that is controlled depending on the transmission power change request received from the terminal.

22. The base station according to claim 21, wherein the charge determination processor further calculates a communication charge for the communication using as parameters the communication charge rate and a time period during which the communication charge rate is kept.

* * * * *